Dec. 26, 1933.    H. C. LORD    1,940,686
VIBRATION DAMPENING MOUNTING
Filed May 5, 1930
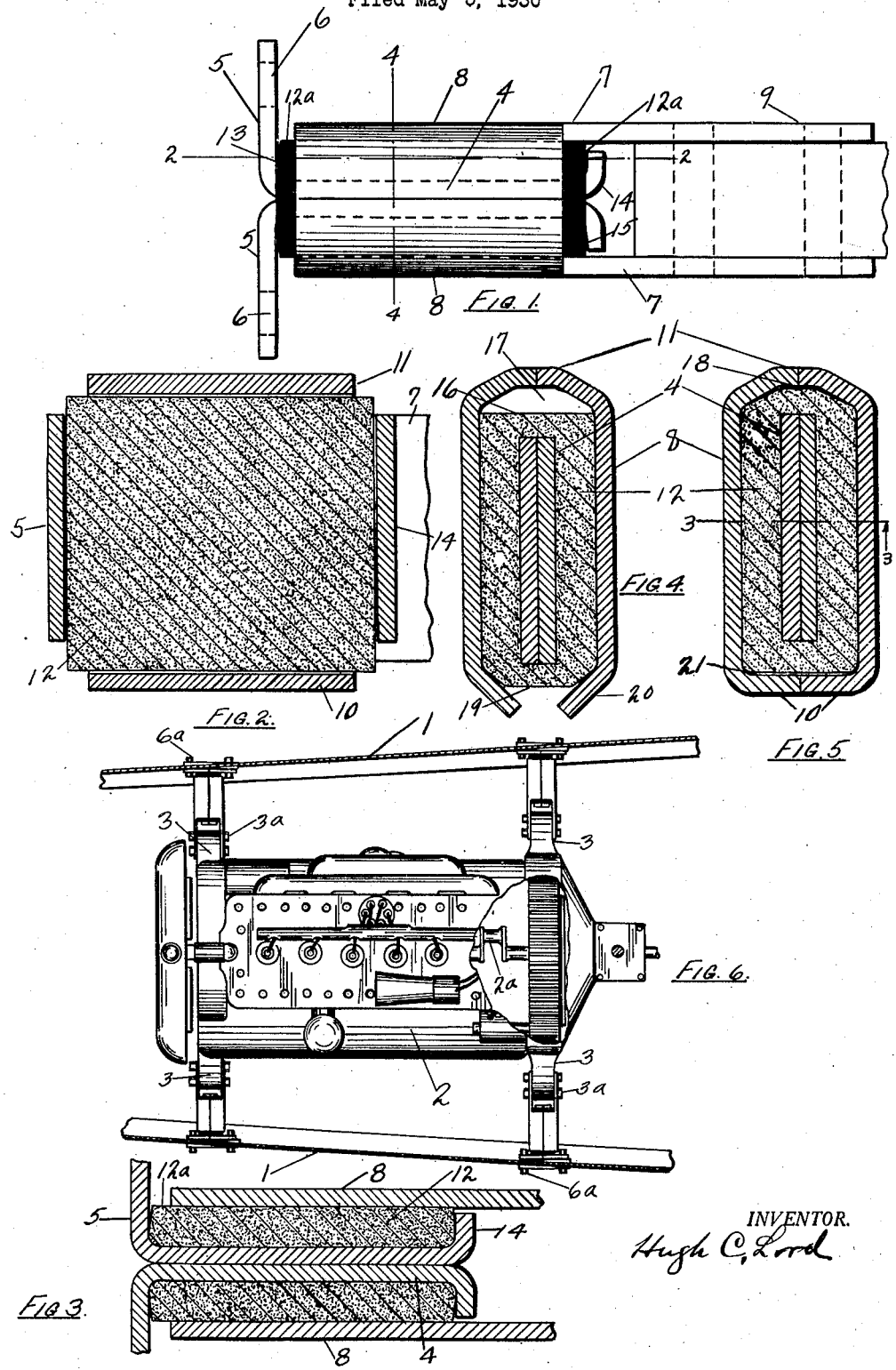
INVENTOR.
Hugh C. Lord Dec. 26, 1933

1,940,686

UNITED STATES PATENT OFFICE 1,940,686

VIBRATION DAMPENING MOUNTING

Hugh C. Lord, Erie, Pa.

Application May 5, 1930. Serial No. 449,969

22 Claims. (Cl. 248—14.2)

The present invention is designed to absorb vibration. Under many conditions vibration is pronounced in two directions, as for instance, in motors such as are used in automobiles there is usually an unbalanced condition in the rotary parts which results in vibration, or, perhaps, the vibration as to the rotary unbalanced condition may have somewhat the condition of an orbital movement crosswise of the motor. With such devices there is very little vibratory action forward and back and stability of the motor in these directions is, therefore, desirable. With the present invention the mounting is comparatively free from movement vertically and crosswise and has a greater resistance to movement lengthwise.

In carrying out the invention, I prefer to use opposing spaced plates between which resilient rubber is secured to the opposing surfaces. The invention also contemplates interposing an increase in resistance to movement beyond the vibration range. Features and details of the invention will appear from the specification and claims.

A preferred embodiment of the invention is illustrated in the accompanying drawing as follows:—

Fig. 1 shows a plan view of the mounting.

Fig. 2 a section on the line 2—2 in Fig. 1.

Fig. 3 a section on the line 3—3 in Fig. 5.

Fig. 4 a section on the line 4—4 showing the mounting before completed and with the rubber free from load.

Fig. 5 a section on the line 4—4 in Fig. 1 of the completed mounting.

Fig. 6 a plan view of an automobile engine.

1—1 mark the sides of the automobile frame, 2 an automobile engine with vertically arranged cylinders and having the usual rotating parts and reciprocating parts with a crank shaft 2a. Supporting arms 3 extend from the side of this frame.

The mounting has a inner member 4. This inner member is made up of two plates, the outer ends of these plates being bent outwardly forming securing flanges, or feet 5 having perforations 6 and this is secured to the vertical wall of the side frame by bolts, or rivets 6a. The two plates may be spot welded together, if desired.

An outer member comprises the side plates 7. These have walls 8 with surfaces spaced from the central member 4 and have extensions 9 which extensions are arranged on the sides of the arms 3 and secured thereto by bolts 3a. The side walls have the inturned edges, or flanges 10 which are in contact, as shown in Fig. 5, and have the approaching flanges 11 at the top, as indicated in Fig. 5.

The rubber 12 is vulcanized around the central member 4 and bonded to the central member and to the walls 8 of the outer member. The ends of the rubber at 13 are not bonded to the feet, or flanges 5 and the opposite edges of the rubber are adjacent to, but not bonded to flanges 14. The rubber is vulcanized in place and as it cools shrinks, thus leaving a minute space between the ends of the rubber at 13 and 15 which gives the minute freedom of movement without materially changing the shear resistance of the vertical wall of rubber between the walls 8 and plates 4. The rubber has extensions 12a beyond the top and bottom flanges, or walls 10 and 11. This extension of rubber working against the shoulders formed by the feet 5 and shoulders 14 increases the resistance over the shear resistance of the rubber and the amount of abruptness of such increase may be controlled by varying the length of the overhanging portion 12a of rubber. Similarly the top and bottom walls of the rubber interpose but little direct resistance to vertical movement through the vibration range, the load being carried through the shear and tension of the rubber between the walls 8 and the plate 4. Thus in vulcanizing the rubber in place the upper edge of the rubber is formed at 16 leaving a definite space 17 which is formed with relation to the weight so as to leave a slight space 18, as indicated in Fig. 5. While the rubber may actually come into contact with the rubber wall where a very little range is desired, even under these conditions up to the moment that the neutral condition of the rubber is passed the main resistance to movement will be the shear of the side walls of rubber, but with any extended movement the top wall will engage and make a very rapid rise in the resistance, thus controlling the movement. Likewise at the bottom the rubber is vulcanized with a slightly concave bottom 19 so that when the weight is placed on the rubber shells 2 and thus there is a downward movement in response to the weight, this bottom of the rubber practically straightens out and the lips 20 which form the final flanges 10 are pressed down into proper relation to the rubber leaving the slight vibration space 21, if desired. In the closing of these lips they are so formed as to length as to put the rubber under initial tension, the top edges of the plates being maintained in their outer position during vulcanization so that the shrinkage of the rubber puts that part of the wall under initial tension. Thus the load is carried by the shear and tension of the rubber and any movement beyond the normal vibration range is quickly resisted by the rubber extensions at the ends and top.

Thus it will be noted that the mounting as placed resists movement crosswise and vertically through this shear and tension of the rubber, but the floating walls of rubber fore and aft do not resist this movement through such shear. Thus the response to vibration vertically and crosswise is very sensitive and with the rubber under tension there is very little noise transmission. On the other hand any excess movement is restrained. This is quite important under some conditions such as in automobile engines where the operating levers are carried with the engine and any excessive movement is very undesirable.

What I claim as new is:—

1. The combination with two members, one supporting the other, said supported member including a rotating element and being subjected to vibratory movements in two directions crosswise of the axis of the rotating element, of opposing plates secured one to each member, said plates having their opposing faces spaced apart and extending in a direction common to the direction of the said vibratory movement, and a resilient element bridging the space between said plates and secured thereto in load supporting relation.

2. The combination with two members, one supporting the other, said supported member including a rotating element and being subjected to vibratory movement in two directions in a plane crosswise of the axis of the rotating element, of opposing plates secured one to each member, said plates having their opposing faces spaced apart and extending in directions common to the directions of the said vibratory movements, and a resilient element bridging the space between said plates and secured thereto, said resilient element through its engagement with said opposing faces sustaining the said vibratory thrusts in said directions with comparative freedom of movement through the vibration range, said plates being so constructed and arranged as to limit the movement in one edgewise direction beyond approximately the vibration range.

3. The combination with two members, one supporting the other, said supported member including a rotating element and being subjected to vibratory movement in two directions in a plane crosswise of the axis of the rotating element, of opposing plates secured one to each member, said plates having their opposing faces spaced apart and extending in directions common to the directions of the said vibratory movements, and a resilient element bridging the space between said plates and secured thereto, said resilient element through its engagement with said opposing faces sustaining the said vibratory thrusts in said directions with comparative freedom of movement through the vibration range, said plates being so constructed and arranged as to limit the movement in both edgewise directions beyond approximately the vibration range.

4. The combination with two members, one supporting the other, said supported member including a rotating element and being subjected to vibratory movement in two directions in a plane crosswise of the axis of the rotating element, of opposing plates secured one to each member, said plates having their opposing faces spaced apart and extending in directions common to the directions of the said vibratory movements, and a resilient element bridging the space between said plates and secured thereto, said resilient element through its engagement with said opposing faces sustaining the major portion of the vibratory thrusts in said directions through shear of the resilient element with comparative freedom of movement through the vibration range, said plates being so constructed and arranged as to limit the movement in one edgewise direction beyond approximately the vibration range.

5. The combination of two members, one supporting the other, said supported member including a rotating element and being subjected to vibratory movement in two directions, one of said members being in the form of a central plate and the other member having plates each side of the central plate, said plates having their opposing faces extending in a plane crosswise of the axis of the rotating element spaced apart and extending in directions common to the directions of the said vibratory movement; and resilient rubber in the space between and secured to the opposing faces of the plates sustaining the major portion of the vibration through the shear of the rubber.

6. The combination of two members, one supporting the other, said supported member including a rotative element and being subjected to vibratory movement in two directions, one of said members being in the form of a central plate and the other member having plates each side of the central plate, said plates having their opposing faces extending in a plane crosswise of the axis of the rotating element spaced and fixed apart and extending in directions common to the directions of the said vibratory movement; and resilient rubber in the space between the plates sustaining the major portion of the vibratory thrusts through the shear of the rubber, said rubber being secured to the plates and held thereby under initial tension.

7. The combination of two members, one supporting the other, said supported member including a rotating element and being subjected to vibratory movement in two directions, one of the members being in the form of a central plate and the other member having plates each side of the central plate extending in a plane crosswise of the axis of the rotating element, said plates having their opposing faces spaced and fixed apart and extending in directions common to the direction of the said vibratory movements; and a resilient element in the space between the plates sustaining the major portion of the vibratory thrusts through shear of the resilient element, said element being secured to the plates and held thereby under initial tension, said plates being so constructed and arranged as to limit the movement in one edgewise direction beyond approximately the vibratory range.

8. The combination of two members, one supporting the other, said supported member including a rotating element and being subjected to vibratory movement in two directions, one of the members being in the form of a central plate, and the other member having plates each side of the central plate extending in a plane crosswise of the axis of the rotating element, said plates having their opposing faces spaced and fixed apart and extending in directions common to the direction of the said vibratory movements; and a resilient element in the space between the plates sustaining the major portion of the vibratory thrusts through shear of the resilient element, said element being secured to the plates and held thereby under initial tension, said plates being so constructed and arranged as to limit the movement in two edgewise directions beyond approximately the vibratory range.

9. The combination with two members, one supporting the other and one of the members having vibratory movement in two directions, of opposing plates, one of the plates being central and secured to one member and the others of said plates being positioned one at each side of the central plate, and spaced therefrom and secured to the other of said members, said opposing plates being brought together to form a complete annulus, said opposing plates extending in directions common to the directions of vibration; and resilient rubber arranged between said plates and sustaining the major portion of the vibratory thrusts through shear and the rubber being secured to the opposing faces of the central and side plates maintaining the rubber under initial tension.

10. The combination with two members, one supporting the other, and one of the members having vibratory movement in two directions, of opposing plates, one of the plates being central and secured to one member and the others of said plates being positioned, one at each side of the central plate, and spaced therefrom and secured to the other of said members, said opposing plates being brought together to form a complete annulus, said opposing plates extending in directions common to the directions of vibration; and resilient rubber arranged between said plates and sustaining through such engagement the major portion of the vibratory thrusts through the shear of the rubber, the portions of the plates brought together acting on the rubber and yieldingly limiting the edgewise movement in one direction to approximately the vibration range.

11. The combination with two members, one supporting the other, and one of the members having vibratory movement in two directions, of opposing plates, one of the plates being central and secured to one member and the others of said plates being positioned, one at each side of the central plate, and spaced therefrom and secured to the other of said members, said opposing plates being brought together to form a complete annulus, said opposing plates extending in directions common to the directions of vibration; and resilient rubber arranged between said plates and sustaining through such engagement the major portion of the vibratory thrusts through the shear of the rubber, the portions of the plates brought together acting on the rubber and yieldingly limiting the edgewise movement in opposed directions to approximately the vibration range.

12. The combination with two members, one supporting the other, and one of the members having vibratory movement in two directions, of opposing plates, one of the plates being central and secured to one member and the others of said plates being positioned, one at each side of the central plate, and spaced therefrom and secured to the other of said members, said opposing plates being brought together to form a complete annulus, said opposing plates extending in directions common to the directions of vibration; and resilient rubber under initial tension and arranged between and bonded to the surfaces of said plates and sustaining the major portion of the vibration through the shear and tension of the rubber, the portions of the plates brought together yieldingly limiting the edgewise movement in one direction to approximately the vibration range.

13. The combination with two members, one supporting the other, and one of the members having vibratory movement in two directions, of opposing plates, one of the plates being central and secured to one member and the others of said plates being positioned, one at each side of the central plate, and spaced therefrom and secured to the other of said members, said opposing plates being brought together to form a complete annulus, said opposing plates extending in directions common to the directions of vibration; resilient rubber under initial tension and arranged between and bonded to the surfaces of said plates and sustaining the major portion of the vibration through the shear and tension of the rubber; and devices limiting the edgewise movement in both directions to approximately the vibration range.

14. A vibration absorbing mounting having a central plate with feet at one end and shoulders at the opposite end; a plate at each side of the central plate, said side plates having securing extensions and top and bottom flanges; and rubber between and secured to the opposing faces of the plates adapted to sustain vibration through the shear of the rubber in two directions, the flanges and shoulders being adapted to limit the edgewise relative movement of the plates.

15. A mounting comprising flat plates; and rubber secured to the faces of the opposing plates and extending beyond an edge of one of said plates, the rubber between the plates sustaining the relative vibratory thrusts on said plates with a comparatively free movement through the vibration range through shear of the rubber, the plates and rubber being so constructed and arranged as to act on the extending portions of the rubber at said edge for exerting a comparatively high resistance to movement beyond the vibratory range in one direction.

16. A mounting comprising flat plates; and rubber secured to the faces of the opposing plates and extending beyond two edges of one of said plates, the rubber between the plates sustaining the relative vibratory thrusts on said plates with a comparatively free movement through the vibration range through shear of the rubber, the plates and rubber being so constructed and arranged as to act on the extending portions of the rubber at said edges for exerting a comparatively high resistance to movement beyond the vibratory range in two directions.

17. A mounting comprising flat plates; and rubber secured to the faces of the opposing plates and extending beyond two edges of one plate and one edge of the other plate, the rubber between the plates sustaining the relative vibratory thrusts on said plates with a comparatively free movement through the vibration range through shear of the rubber, the plates and rubber being so constructed and arranged as to act on the extending portions of the rubber at said edges for exerting a comparatively high resistance to movement beyond the vibratory range in three directions.

18. A mounting comprising flat plates; and rubber secured to the faces of the opposing plates and extending beyond two edges of each plate, the rubber between the plates sustaining the relative vibratory thrusts on said plates with a comparatively free movement through the vibration range through shear of the rubber, the plates and rubber being so constructed and arranged as to act on the extending portions of the rubber at said edges for exerting a comparatively high resistance to movement beyond the vibratory range in four directions.

19. The combination with two members, one supporting the other, said supported member including a rotating element and being subjected to vibratory movements in two directions crosswise of the axis of the rotating element, of opposing plates secured one to each member, said plates having their opposing faces spaced apart and extending in a direction common to the direction of the said vibratory movement; and a resilient rubber element bridging the space between said plates and bonded to at least one of said plates and secured in load-supporting relation to the other of said plates and disposed to subject the rubber to the crosswise vibratory thrusts in two directions through shear of the rubber.

20. The combination with two members, one supporting the other, said supported member including a rotating element and being subjected to vibratory movements in two directions crosswise of the axis of the rotating element, of two mountings spaced apart axially of the rotating element and each comprising opposing plates secured one to each member, said plates having their opposing faces spaced apart and extending in a direction common to the direction of the said vibratory movements, and a resilient element bridging the space between said plates and secured thereto in load supporting relation.

21. The combination with two members, one supporting the other, said supported member including a rotating element and being subjected to vibratory movement in two directions in a plane crosswise of the axis of the rotating element, of opposing plates secured one to each member, said plates having their opposing faces spaced apart and extending in directions common to the directions of the said vibratory movements, and a resilient element bridging the space between said plates and secured thereto, said resilient element through its engagement with said opposing faces sustaining said vibratory thrusts in said directions with comparative freedom of movement through the vibration range, one of said plates having a shoulder engaging the edge of the resilient element to limit the movement in one edgewise direction beyond approximately the vibration range.

22. The combination with two members, one supporting the other, said supported member including a rotating element and being subjected to vibratory movements in two directions crosswise of the axis of the rotating element, of two mountings spaced apart axially of the rotating element, and each comprising opposing plates secured one to each member, said plates having their opposing faces spaced apart and extending in a direction common to the direction of the said vibratory movement; and a resilient rubber element bridging the space between said plates and bonded to at least one of said plates and secured in load-supporting relation to the other of said plates and disposed to subject the rubber to the crosswise vibratory thrusts in two directions through shear of the rubber.

HUGH C. LORD.